United States Patent [19]

Carmichael et al.

[11] Patent Number: 5,323,327
[45] Date of Patent: Jun. 21, 1994

[54] ON-THE-FLY CATALOGING OF LIBRARY CELL CONTENTS IN AN AUTOMATED ROBOTIC TAPE LIBRARY

[75] Inventors: Larry K. Carmichael, Westminster; Frederick G. Munro, Broomfield; Cheryl E. Netter, Golden; David L. Trachy, Louisville, all of Colo.

[73] Assignee: Storage Technology Corporation, Louisville, Colo.

[21] Appl. No.: 877,321

[22] Filed: May 1, 1992

[51] Int. Cl.[5] .............................................. G06F 15/46
[52] U.S. Cl. .................... 364/478; 235/383; 360/92; 364/479; 395/94; 414/274
[58] Field of Search ................. 364/478, 479; 360/92; 369/39; 414/273, 274, 281, 282, 283, 277; 395/94; 235/375, 385, 383

[56] References Cited

U.S. PATENT DOCUMENTS

| | | | |
|---|---|---|---|
| 4,115,805 | 9/1978 | Morton | 382/23 |
| 4,812,629 | 3/1989 | O'Neil et al. | 414/274 X |
| 4,907,169 | 3/1990 | Lovoi | 395/94 |
| 4,928,245 | 5/1990 | Moy et al. | 364/478 |
| 4,969,108 | 11/1990 | Webb et al. | 395/94 |
| 5,059,772 | 10/1991 | Younglove | 360/92 X |

Primary Examiner—Joseph Ruggiero
Attorney, Agent, or Firm—Duft, Graziano & Forest

[57] ABSTRACT

A method and apparatus are described for on-the-fly cataloging of library cell contents in an automated robotic tape library. This method decouples the robotic arm motion/tape cartridge label scanning process from the image processing software/hardware. In accordance with the present invention, tape cartridge label images are captured at a library system processor priority which is higher than the priority of the image processing task. These captured images are stored in a circular buffer while image processing continues to take place in a lower priority task. Both the image processing system hardware and software are asynchronous with respect to the velocity of the robotic arm used to scan the tape cartridge cells. The scanning velocity of the robotic arm can be maximized with respect to purely mechanical, electrical, or optical camera considerations and is independent of the library system processor image processing speed. The present method provides a further advantage with respect to robotic arm position calibration. Not only can tape cartridge labels be read with maximum camera line speed, but arm calibration data can also be read on-the-fly to allow continual and rapid verification and calibration of robotic arm positioning.

25 Claims, 5 Drawing Sheets

ON-THE-FLY CATALOGING OF LIBRARY CELL CONTENTS IN AN AUTOMATED ROBOTIC TAPE LIBRARY

FIELD OF THE INVENTION

This invention relates generally to computer controlled automated tape cartridge libraries and, in particular, to apparatus for and a method of visually cataloging or "auditing" the contents of an automated tape library while the cartridge label scanning mechanism moves continuously at an optimum rate to scan cartridge labels without skipping a cartridge label or losing cartridge label data that has been scanned.

PROBLEM

It is sometimes a problem in tape cartridge library systems, to identify scanned cartridge label images as fast as the label images can be scanned and generated by the library vision system.

Automated tape cartridge library systems typically employ a vision system to scan labels placed on the tape cartridges stored within the system. When a cataloging operation is requested by a host processor to identify all cartridges in the library, a scan of each cartridge label is performed to establish the identity and location of each cartridge in the library. The vision system typically uses a video camera attached to a robotic arm. In performing a cataloging operation, the robotic arm moves the video camera through a sequence of positions while each cartridge cell is scanned by the camera. The video camera produces an image of the tape cartridge label in each scanned cell. Each label image is then "processed" to determine the identity of the tape cartridge to which the label is affixed.

In conventional automated tape cartridge library systems, the velocity at which the robotic arm and camera move to scan cartridge cells is slower than optimum. This is a result of the fact that some cartridge labels are relatively difficult to read and require extraordinarily long image processing time. Furthermore, because label image processing requires a significant amount of processor time, it is not feasible to simultaneously process two label images. Therefore, when image (n) is still being processed while the next label (n+1) has been completely scanned, if the robotic arm continues to move, the scan of the following label (n+2) will necessarily be skipped because the scanning of label (n+2) cannot begin until the scanned image for label (n+1) is transferred out of the video camera buffer by the processor.

Because of (1) the above-described variance in label image processing time and (2) the processor-intensive requirements of label image processing, conventional library systems have had three options:

(1) stop the robotic arm movement (and the label scanning) when a given label image cannot be totally processed before a scan of the subsequent label is initiated;

(2) move the robotic arm continuously at a less than optimum velocity in order to avoid skipping difficult-to-read cartridge labels; or (3) move the robotic arm continuously at a relatively high and optimum velocity with the consequence of having to skip the scanning of a cartridge cell because the processing of a difficult-to-read label image has not been completed by the time the subsequent image has been scanned. In this situation, the skipped cell must be re-scanned.

A tape cartridge library catalog operation takes place each time a system door (or "cartridge access port") is opened and closed to remove or add a cartridge. The library system must be taken off-line from the host processor while the library door is opened. It is apparent that the faster the cataloging operation is performed, the sooner the library system can be placed back on-line for use by the host processor and the library system user.

It is therefore seen that the present tape library systems have deficiencies which render their performance less than optimum.

SOLUTION

These problems are solved and a technical advance is achieved in the field by the "on-the-fly" cataloging method and apparatus of the present invention. In accordance with this invention, the cataloging of tape cartridges is accomplished on-the-fly while a robotic arm and attached camera continuously move to scan cartridge labels. This scanning is performed at a higher velocity than is possible with prior automated library systems. Tape cartridge label scanning is executed without skipping or having to re-scan tape cartridge cells. The scanning of tape cartridge labels is performed at an optimum speed without having to stop or slow down the movement of the robotic arm.

On-the-fly scanning of the cartridge labels is achieved by decoupling the cartridge label scanning from the image processing software/hardware. This decoupling is provided by buffering scanned label images and asynchronously processing the label images with respect to the capturing of the tape labels. A tape cartridge label is considered to be "captured" when a completed video camera scan of a given label image is written from the camera to an external storage medium.

In the present invention, label images are captured at a library system processor priority level which is higher than the priority of the processor's image processing task. These captured images are stored in a circular buffer while image processing continues to take place in a lower priority task. The image processing system hardware and software are asynchronous with respect to the velocity of the robotic arm and the scanning of the cartridge cells. Therefore, the scanning and velocity of the robotic arm is maximized with respect to purely mechanical, electrical, or optical camera considerations and is independent of the library system processor image processing speed.

The present method and apparatus provide a further advantage with respect to robotic arm position calibration. Not only can cartridge labels be read with high robotic arm velocity, but robotic arm calibration target data can also be read on-the-fly to allow continual and rapid verification and repetitive calibration of robotic arm positioning.

Another novel feature of the present invention is the buffering of unreadable bar code images to provide remote diagnostic information. A diagnostic buffer, separate from the circular buffer, is used to store bar code images which cannot be successfully processed. This buffer is connected to a modem which transmits the unreadable bar code data to a remote site for diagnostic purposes. This diagnostic information is used to facilitate the pinpointing of faulty hardware responsible for bar code reading problems, and also to provide a means for optimization of bar code image processing algorithms.

DETAILED DESCRIPTION OF THE INVENTION

Figure 1:
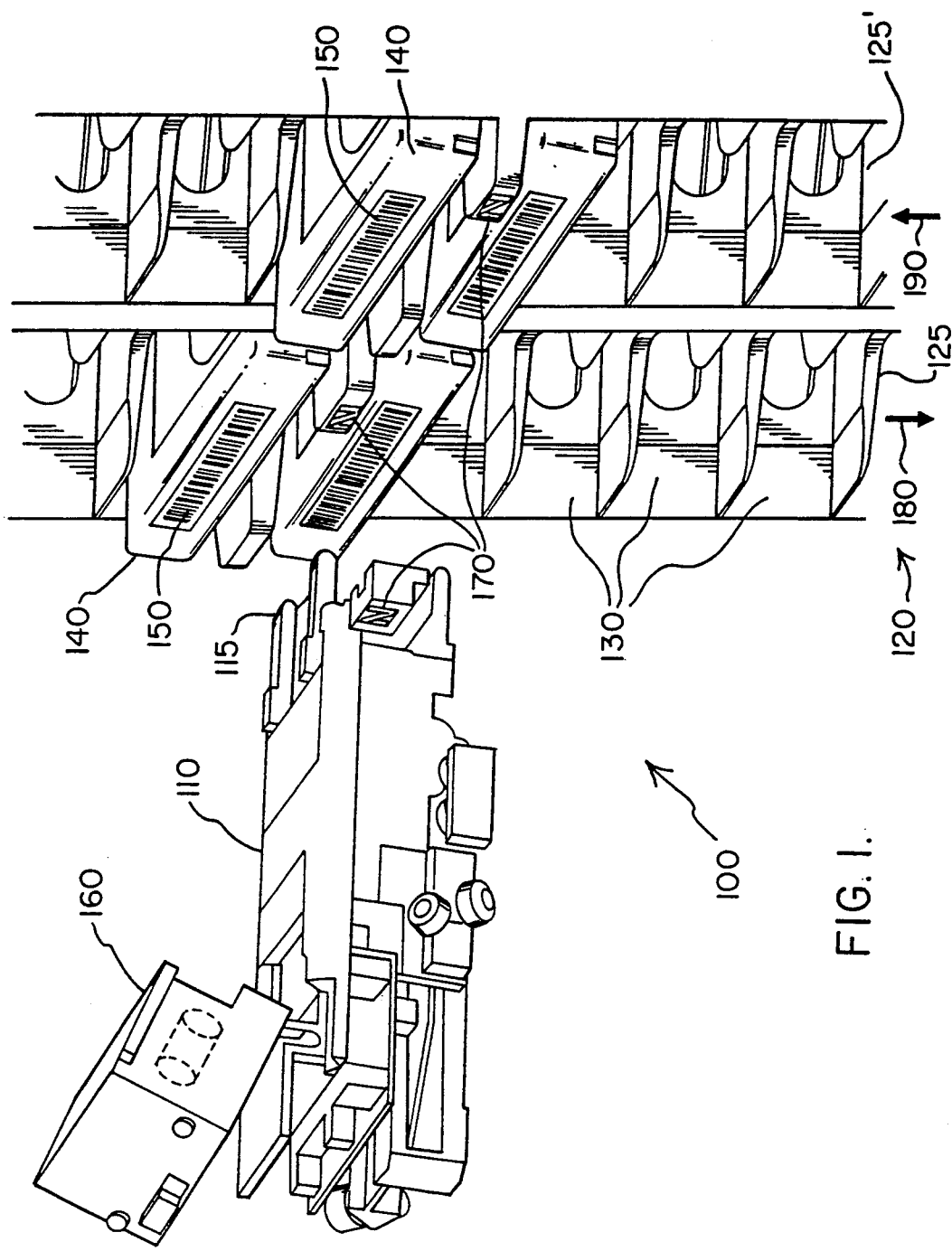
FIG. 1 is a perspective cutaway view of a segment of a typical automated tape cartridge library system.

FIG. 1 shows a perspective view of a segment of a typical automated tape cartridge library/storage system 100 which includes one or more cylindrical arrays 120 of tape cartridge storage cells 130. Each of the cells 130 is arranged in a column 125,125'. A robotic arm 110 is pivotally rotatable about each array 120 and contains a tape cartridge retrieval (gripper) mechanism 115 and a video camera vision system 160. Each storage cell 130 is capable of storing a tape or other type of media cartridge 140 and is accessible by the robotic arm 110 to move it elsewhere in the system.

A typical prior art automated library system operates to store and retrieve a large number of magnetic tape cartridges of the 3480-type format for an associated host processor. An example of such a system is the 4400 Automated Cartridge System (ACS) manufactured by Storage Technology Corporation of Louisville, Colo.

Figure 7:
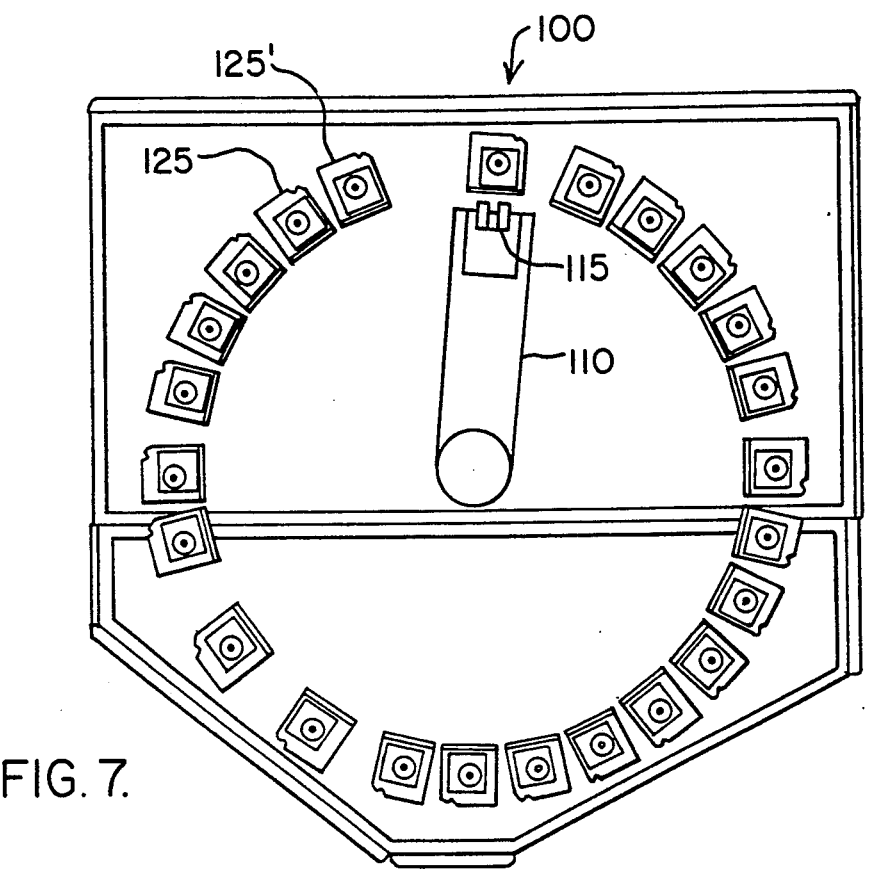
FIG. 7 illustrates a top view of the overall environment of a typical automated robotic tape library system.
Figure 8:
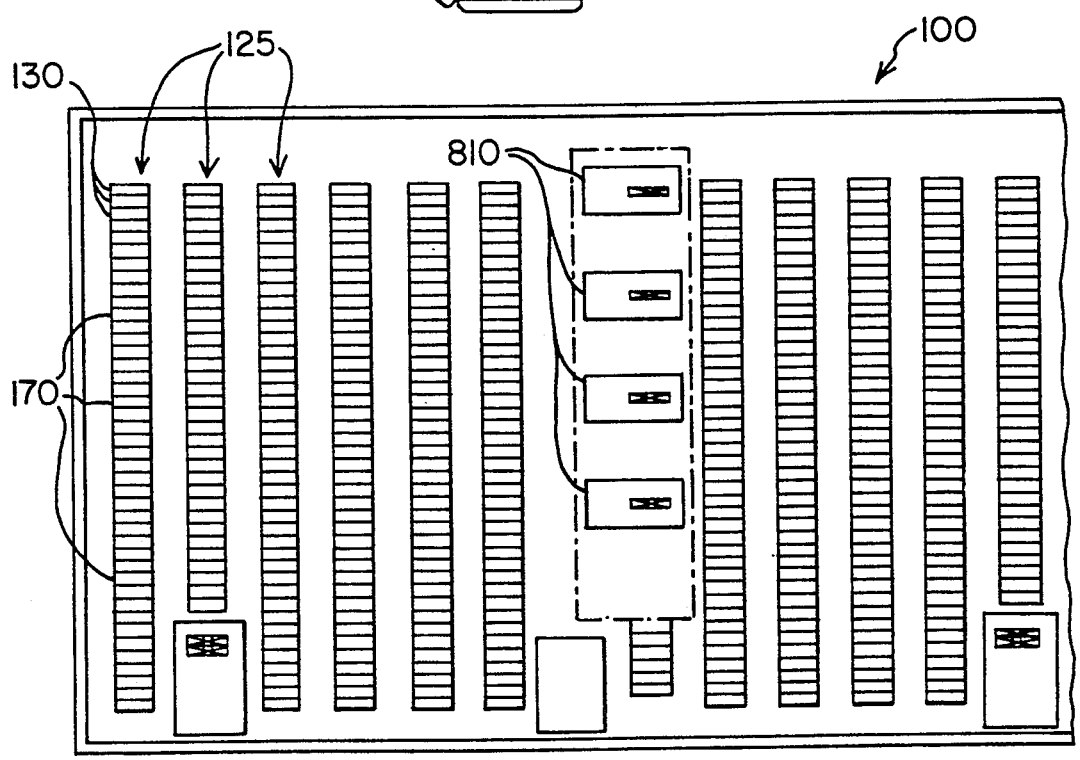
FIG. 8 illustrates a side view of an internal segment of the library system.

FIG. 7 illustrates a top view of the overall environment of a typical automated robotic tape library system 100 wherein the cataloging apparatus and method of the present invention are employed. FIG. 8 illustrates a side view of a segment of the library system 100.

The contents of pending U.S. patent application Ser. No. 07/819,279, titled "Cartridge Positioning Mechanism For Robotic Magnetic Tape Cartridge Handling System" and filed on Jan. 13, 1992, are hereby incorporated by reference in the present application to the same extent as fully set forth herein.

In operation, the library system 100 receives a request from an associated host computer (not shown) to move a specific stored tape cartridge 140 to a tape drive 810 so that the tape can be read or written to by the host computer. A label 150 is affixed to each tape cartridge 140 so that the cartridge VOLSER (volume serial number) to cartridge location relationships can be determined in library system 100. The present invention reads a bar code which is affixed to each label 150 for the purpose of identifying the tape cartridge 140 to which it is affixed. The bar code is read by the vision system 160 which, in a preferred embodiment of the invention, is a video line scan camera 160. The bar code in one embodiment of the present invention is a "three of nine" type bar code, but the invention is operable with any other type of machine-readable labels.

Before tapes stored in the library system 100 are accessed by the associated host computer system, a cataloging is usually made of the tape cartridges 140 contained therein. Identification of the tape cartridge 140 stored in each cell 130 is made using video camera 160 to read the bar code label 150 on the end of the tape cartridge 140.

In the present system, both the image processing system hardware and software operate asynchronously with respect to the velocity of the robotic arm used with camera 160 to scan the tape cartridge cells. The scanning velocity of the robotic arm can be maximized with respect to purely mechanical, electrical, or optical camera considerations and is independent of the library system processor image processing speed. Because of this combination of asynchronous scanning/image processing and maximized scanning velocity, the scanning of cartridge cells 130 can take place on-the-fly without requiring robotic arm 110 to stop or re-scan cartridge cells 130.

Robotic Arm Calibration

Before the automated library system 100 can function, the position of robotic arm 110 must be calibrated with respect to the storage cell array 120. Initially, a coarse mechanical position calibration of robotic arm 110 is performed. Next, the vision system 160 is used to calibrate the position of robotic arm 110 relative to a target 170 located within the array 120 of tape cartridge storage cells 130.

After the robotic arm position is calculated with respect to a given target 170, a calculation is then made of the offset between this target 170 and the actual position of the robotic arm 110. This information is used to locate the tape cartridges 140 which are stored in the cells 130 in the library system 100.

The present invention also provides for "on-the-fly" calibration of robotic arm 110 position with respect to cartridge cell 130 position. Not only can tape cartridge labels 150 be read with high scanning velocity, but arm calibration targets 170 can also be read on-the-fly to allow continual and rapid verification and calibration of robotic arm 110 positioning.

Robotic Arm Motion

For purposes of efficiency, the robotic arm 110 used with the present invention moves vertically from cell 130 to cell 130 to scan each column 125, 125'. As robotic arm 110 moves past each cell 130, line scan camera 160 makes an "on-the-fly" scan of the bar code label 150 affixed to the cartridge 140 in the cell 130. In performing a catalog operation, robotic arm 110 moves in a vertical direction past a given column 125/125', which in this example is initially column 125. The initial direction of movement of robotic arm 110 depends upon the position of arm 110 relative the top or bottom of the respective cell column 125/125'. As shown in FIG. 1, robotic arm 110 first moves in an upward direction 180 to scan column 125 and then moves horizontally to an adjacent column 125' and proceeds to scan the column 125' in an opposite downward direction 190. This procedure is repeated column by column until all cells 130 in the library system 100 are scanned.

In a preferred embodiment of the present invention, the line scan camera vision system 160 performs horizontal scanning of cartridge bar code labels 150, while the robotic arm 110 moves in a vertical direction 180 or 190 at a right angle to the longitudinal (lengthwise) axis of the labels 150, which are aligned lengthwise along the front of a given cartridge 140. It is also possible that in other embodiments the labels 150 could be oriented such that the robotic arm 110 is moved in a direction parallel to the longitudinal axis of the labels 150 so that the vision system can scan the labels 150.

System Hardware

Figures 2, 3, 4:
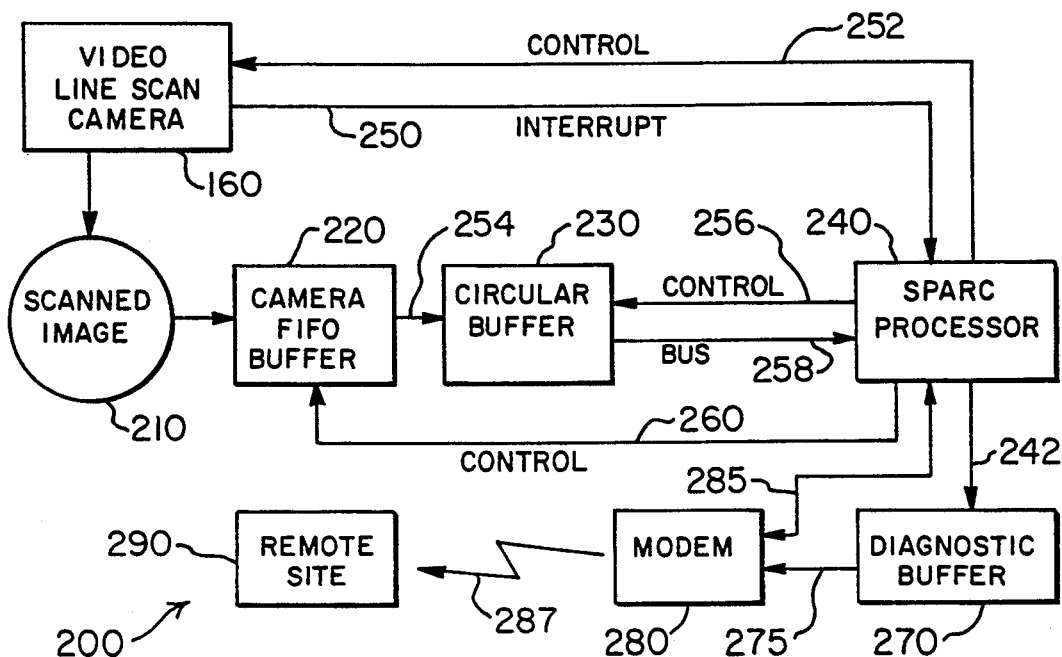
FIG. 2 is a block diagram of the hardware used in the present invention.
FIG. 3 illustrates image capture/processing in a system using a conventional unbuffered synchronous processing scheme.
FIG. 4 illustrates image capture/processing wherein the method of the present invention is utilized.

FIG. 2 illustrates in block diagram form the library system hardware 200 used in the present invention. Video line scan camera 160 is connected to the library system processor 240 via interrupt line 250. Processor 240 is a SPARC-type processor which is well-known in the art. One embodiment of the present invention comprises a Cypress model CY 7C600 chip set.

In operation, a scanned image 210 is sent one line at a time to camera FIFO (First-In-First-Out) buffer 220, which holds up to 32 scan lines (although a typical bar code image requires only approximately 25 scan lines). Interrupt line 250 signals processor 240 whenever a scan of a complete image 210 is available in camera FIFO buffer 220. Line scan camera 160 is connected to processor 240 via control line 252 which initiates a transfer over path 252 of line scan data from camera 160 to FIFO buffer 220 whenever a "scan complete" interrupt is received from camera 160 over line 250. Bar code image data is transmitted from FIFO buffer 220 to circular buffer 230 via bus 254 when a control signal is received over line 260 from processor 240. Circular buffer 230 and processor 240 are interconnected via control line 256 which initiates the transfer of bar code image data from circular buffer 230 to processor 240 via bus 258.

Circular buffer 230 comprises a plurality of sequential memory locations which logically wrap around from the last location to the first location. Associated with the circular buffer 230 are a start pointer and an end pointer. The start pointer indicates the first location in the buffer 230 in which data is presently stored. The end pointer indicates the last location in which data is presently stored. When the start pointer is equal to the end pointer, the buffer 230 is empty. When the start pointer is equal to a value of the end pointer minus one (in wraparound mode), the buffer 230 is full. The present invention does not allow data pointed to by the start pointer to be overwritten when the buffer 230 is full. The concept of a circular buffer is well-known in the art.

Processor 240 is also connected to a diagnostic buffer 270 via bus 242. Buffer 270 is used to store data for labels 150 which are unreadable by the library system hardware 200. Buffer 270 is connected via line 275 to a modem 280 which, in turn, is connected via a telephone line 287 to a remote site 290. Modem 280 and processor 240 communicate via line 285.

Image Capture and Processing

The video camera 160 used by the present invention to scan bar code labels 150 is a line scan camera 160 having a resolution of 2048 pixels per line. A line scan camera captures an image of a scanned object as a 1×n linear pixel array, where n is equal to 2048 in a preferred embodiment of the present invention. Video line scan technology is well-known in the art. Each bar code can be captured as a 25 line image (although the line scan camera FIFO buffer 220 can accommodate 32 lines). An interrupt is generated and applied to line 250 each time a complete image 210 is taken so that the library system processor 240 is notified when an entire image 210 has been captured.

In order to scan a column 125,125' in cell array 120, robotic arm 110 (to which line scan camera 160 is attached) is given a single set of movement instructions by the library system processor 240. These include (1) initial travel distance, (2) number of lines per image, and (3) distance between line scans. All distances are defined in terms of robotic arm servo motor tachometer counts.

In contrast to conventional methods, the present method facilitates continuous robotic arm 110 movement without loss of image data or stopping the robotic arm 110 to wait for tape cartridge label image processing. First, each tape cartridge label image 210 is scanned and "captured" by the video camera 160 at a higher priority in the library system processor 240 than the priority of the image processing task. These scanned label images 210 are then stored in a circular buffer 230 while image processing continues to take place in a relatively lower priority library system processor task. Therefore, if a subsequent tape cartridge label image 210 is captured by video camera 160 before the library system processor 240 has processed the previous label image 210, the subsequently captured image 210 is not lost.

Image capture is not entirely continuous, however. In order to reduce image processing overhead, image capture by video camera vision system 160 is temporarily suspended during the interval in which robotic arm 110 travels between adjacent labels 150. This suspension of image capture/processing eliminates unnecessary processing and further ensures that processing of actual label images can be accomplished without stopping the robotic arm 110 or requiring re-scanning of labels 150.

In addition, to eliminate unnecessary processing time, cartridge cells not containing cartridges 140 are not scanned or processed. A proximity detector 195 on the robotic arm 110 is used to detect these empty cells 130. An infrared light source proximity detector 195 is used in a preferred embodiment of the present invention, but the proximity detector 195 could also be a low frequency audio-based proximity detector such as that employed in automatic focus cameras, or the like.

Since the scanning process runs asynchronously with respect to the image processing, the image processing function is not constrained by the speed of the scanning process and is also asynchronous with respect to the velocity of the robotic arm 110 used to scan the tape cartridge cells 130. This asynchronous relationship is result of the fact that the scanning is asynchronous with respect to the robotic arm 110 speed because scanning is triggered by robotic arm 110 tachometer counts as opposed to a clock. Therefore, the arm movement velocity of the robotic arm 110 can be maximized with respect to mechanical, electrical or optical camera considerations and is independent of the image processing speed of the library system processor 240.

FIG. 3 and FIG. 4 provide a comparison between a library system using a conventional image capture/processing method and library system 100 using the apparatus and method of the present invention. FIG. 3 illustrates a conventional unbuffered synchronous image capture/processing scheme. FIG. 4 illustrates the buffered asynchronous method of the present invention. Each vertical frame (column) in FIGS. 3 and 4 represents a time interval which is equal to an approximately constant time interval required to scan/capture a bar code image 210. Each row in FIGS. 3 and 4 represents the state of a specific scanned bar code image 210 as a function of the time interval. The following abbreviations apply with respect to FIGS. 3 and 4:

$S_n$ = image(n) being Scanned
$B_n$ = captured image(n) being Buffered in circular buffer
$P_n$ = image(n) being Processed Since there are numerous variables in a given image scanning situation which are not relevant to the efficiency of the image scanning/processing task, the following assumptions apply with respect to FIGS. 3 and 4 for the purpose of explanatory simplification:

1. The video camera can buffer only one complete bar code image 210 at any given time;
2. A new label must be scanned every two frames if the robotic arm movement is continuous at high velocity;
3. It may take up to 4 frames to process an image 210 which is difficult to read;
4. The video camera can scan a bar code label while processing is being performed;
5. A new bar code image scan cannot be performed until the previous scan is either processed or buffered; and
6. Buffering and image processing for a given image 210 may be combined into the same frame if the processor 240 is not presently processing another image.

Image processing requirements vary from one tape label to another because of factors such as label alignment, reflectivity, variations in bar width, damage, and manufacturing variations. It is readily observable from FIG. 3 that a problem occurs in a conventional unbuffered synchronous system when an anomalous (difficult to read) bar code image is processed. As shown in FIG. 3, frame 1, bar code label 1 is scanned to generate image 1. Note that image 1 takes two frames to process, which is the normal case. Next, in frame 3, label 2 is captured, while image 1 is being processed. In frame 4, processing is initiated for image 2, which, due to a number of possible anomalies, requires 4 frames to process. Label 3 is then scanned in frame 5 to generate image 3. Note that the "X"s in frames 6 and 7 indicate that scanned image 3 cannot be processed until the previously scanned image (number 2) has been processed. Since image 2 is being processed from frame 4 through frame 7, image 3 cannot be processed until frame 8, which causes the scanning of label 4 in frame 7 to be missed or skipped. Label 4 is skipped because of the fact that a subsequent bar code image scan cannot be performed until the previous scan is either processed or buffered (See 5., above). In this situation, robotic arm 100 must re-scan the cell 130 containing the cartridge 140 having label 4.

The present invention, as shown in FIG. 4, avoids the problem of cell re-scanning by storing scanned images in a circular buffer 230 and asynchronously processing the stored images with respect to the capturing thereof. In FIG. 4, frame 1, label 1 is scanned to generate image 1 which is stored in circular buffer 230 in frame 2. As in FIG. 3, image 1 takes two frames to process. Next, in frame 3, label 2 is scanned while image 1 is being processed. In frame 4, image 2 is buffered and processing is initiated for image 2, which requires 4 frames to process. In frame 5, label 3 is scanned and then buffered in frame 6. Although image 2 is still being processed, label 4 can nevertheless be scanned in frame 7, due to the fact that image 3 has been written out of video camera FIFO into circular buffer 230, thus leaving room in FIFO for the label 4 image.

Process Catalog Request

Figure 5:
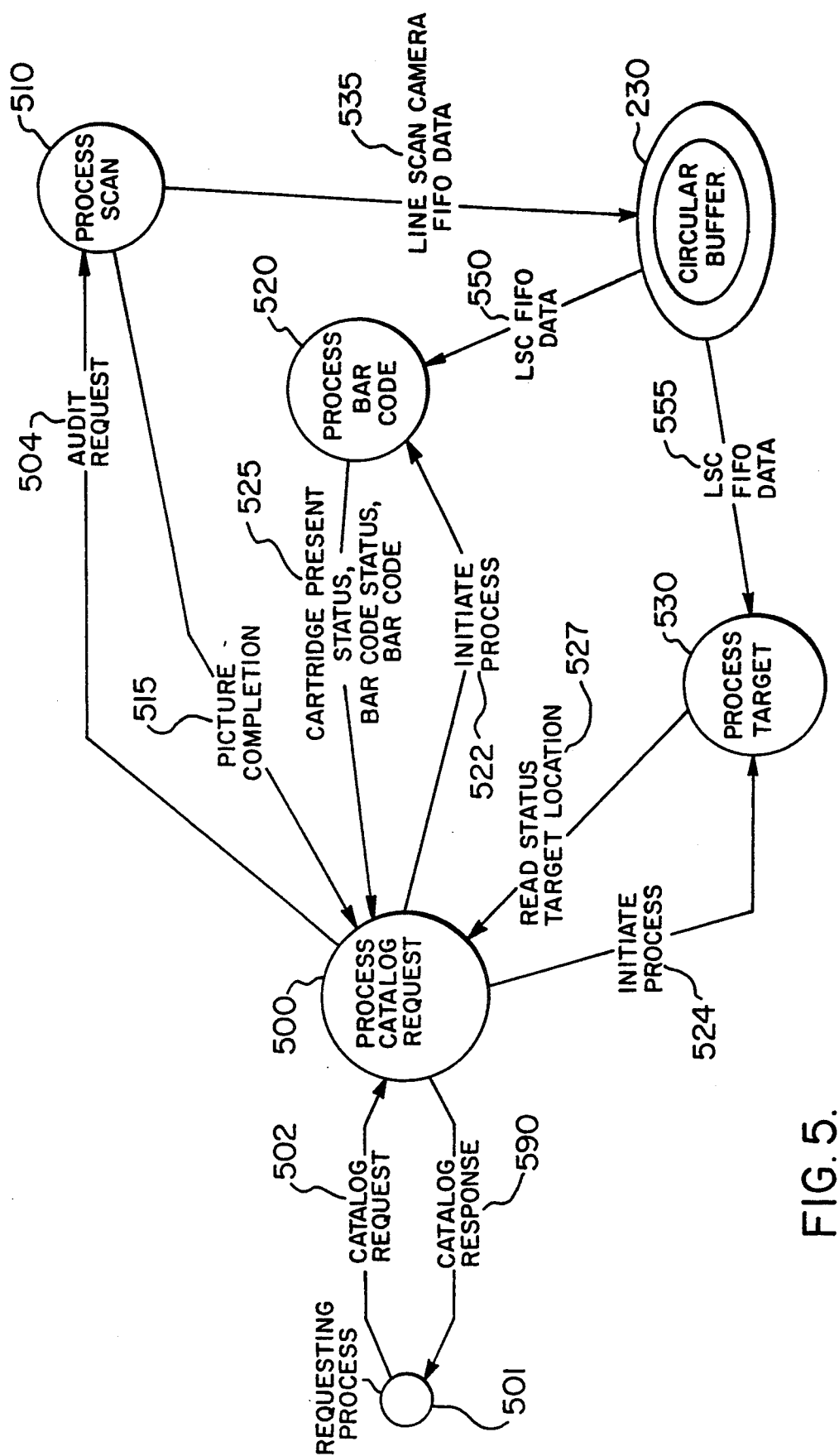
FIG. 5 is a process diagram of the high-level processes employed in the present invention.

FIG. 5 is a diagram of the high-level processes employed in the present invention. More specifically, FIG. 5 details the process 500 which accepts and processes catalog requests issued by a host computer connected to the library system 100. The Process Catalog Request process 500 is executed entirely within library system processor 240.

Initially, the Process Catalog Request process 500 receives from a requesting process 501 issued by the host computer an ordered list of logical entities to be cataloged. These logical entities are typically cells 130 or targets 170. Process Catalog Request process 500 then issues this list via an Catalog Request 504 to the Scan Cartridge process 510. For each cell 130 or target 170 in the list, the Scan Cartridge process 510 sends a Picture Completion status 515 as the scanning of that cell 130 or target 170 is completed. Once the scanning is complete, the Process Catalog Request process 500 initiates either the Process Bar Code 520 or the Process Target process 530 via 522 or 524, respectively, depending on the type of entity scanned.

The Scan Cartridge process 510 writes data from line scan camera FIFO buffer 220 into circular buffer 230 via path 535. This FIFO buffer data is made available to the appropriate processing routine, via paths 550 and 555, for the Process Bar Code process 520 and the Process Target process 530, respectively.

If a bar code has been scanned, then the Process Bar Code process 520 returns, via path 525, a Bar Code status on process completion. This Bar Code status includes whether a cartridge 140 is present in the cell 130, and if so, an indication of the readability of the VOLSER (volume serial number) and, if readable, the VOLSER and media type.

If a target 170 has been scanned, then the Process Target process 530 returns, via path 527, a status on process completion indicating the readability of the target 170 and, if available, the Z (vertical) and theta (rotational) robotic arm tachometer values for the center of the target 170.

The responses from the Process Bar Code 520 and Process Target 530 processes are packaged into a Catalog Response and returned to the requesting process 501 via path 590.

Any motion or line scan camera 160 errors that occur during the scan cause the rest of the scan to be aborted and an error status is returned to the requesting process 501 with the completed portion of the Catalog Response. In the unlikely case of a circular buffer overflow condition (bar code/target processing could not keep up with the scan), the portion of the scan which was lost is regenerated as a new smaller scan.

Process Scan Command

Figure 6:
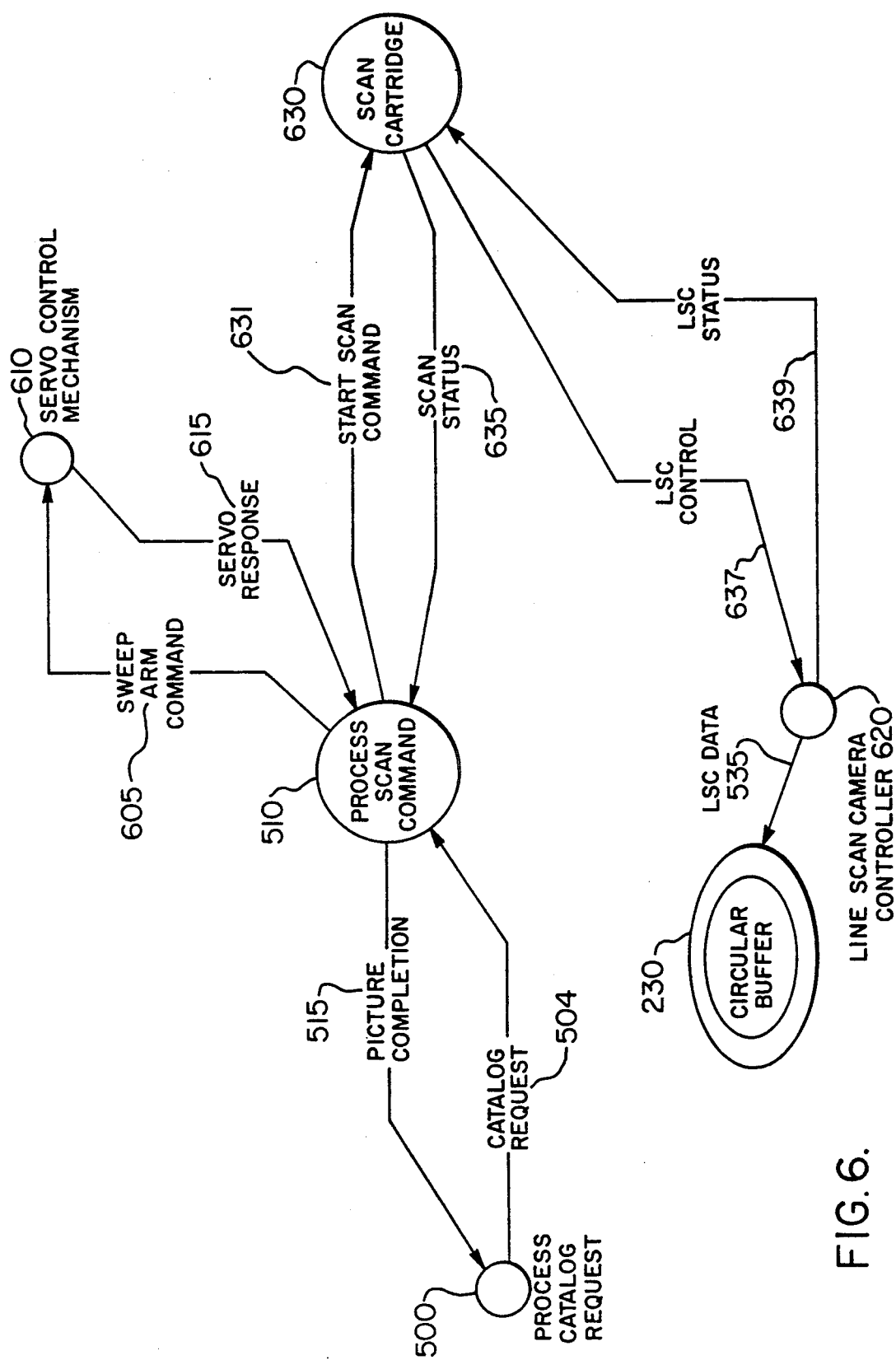
FIG. 6 is a process diagram of the "process scan" command.

FIG. 6 is a process diagram of the "Process Scan" command 510. The Process Scan Command 510 controls the scanning of cells 130 in a single column 125,125' of the cell array 120. The scanning process is initialized by determining the position in a specific column 125 from which to start the scanning. This starting position is determined from catalog range parameters in the Catalog Request command 504 which is sent from the Process Catalog Request process 500 to the Process Scan command 510. The starting scan position could be at the top or bottom of the specified column 125 to be scanned depending on the current robotic arm 110 vertical position.

Next, robotic arm movement commands are sent from the Process Scan Command 510 to servo control mechanism 610 to move robotic arm 110 and attached video camera 160 to the appropriate starting position. Typically, this starting position is either the top or the bottom of a specified column 125,125', whichever is closer to the present robotic arm 110 position. These robotic arm movement commands include a Sweep Arm command 605, which is sent to servo control mechanism 610 to sweep (continuously move the robotic arm 110) past the cells 130 to be scanned until an end of scan position specified in command 605 is reached. The Process Scan command 510 receives robotic arm/camera servo position Information from servo control mechanism 610 via path 615.

The type, row and column of the cell 130 (or target 170) to be scanned is then placed into a Start Scan command which is sent via path 630 to the Scan Cartridge process 630. Scan Cartridge process 630 communicates with line scan camera controller 620 via control line 637. Line Scan Camera Status is returned to Scan Cartridge process 630 via path 639. The overall Scan Status of the cell 130 being scanned is then returned to the Process Scan Command via path 635. Scan Status includes an indication of whether a tape cartridge 140 is present in the cell 130 being scanned, and also indicates the robotic arm tachometer counts.

Cells 130 and targets 170 are scanned until there are no more cells 130 or targets 170 specified in the Scan Cartridge command (i.e., the end of scan position for a given column 125 has been reached). As each cell 130 is scanned, scan data 535 from FIFO buffer 220 in line scan camera controller 620 is stored in the next sequential memory area in circular buffer 230. Finally, the Process Scan command 510 waits for an end of motion response from servo control mechanism 610 and returns final Picture Completion status via path 515 to Process Catalog Request process 500.

It should be noted that the method of the present invention is not limited to use solely with magnetic tape cartridge library systems 100, but would work equally well with other robotic storage systems, such as optical disk or video cassette libraries, or with any system wherein a robotic arm 110 is coupled to a scanning device to locate or catalog objects in a library, warehouse, or the like.

It is to be expressly understood that the claimed invention is not to be limited to the description of the preferred embodiment but encompasses other modifications and alterations within the scope and spirit of the inventive concept.

We claim:

1. In a storage system having a robotic arm for placing objects in and removing objects from a plurality of cells, said robotic arm having scanning means attached thereto for scanning images of identification labels affixed to said objects, said storage system having a processor for processing said images to identify said objects; a method of operating said system for capturing said images asynchronously with the processing of said images, said method comprising the steps of:
    (a) moving said robotic arm past said cells;
    (b) scanning each of said labels with said scanning means to generate a scanned image for each of said labels;
    (c) storing each said scanned image in a first buffer;
    (d) processing each said scanned image stored in said first buffer seriatim to determine an identity of each of said objects;
    (e) continuing to move said robotic arm at a substantially constant velocity while continuing said processing;
    (f) storing in a second buffer said scanned images whose identity is undeterminable in said step of processing; and
    (g) using said scanned images stored in said second buffer for diagnostic purposes related to said storage system.

2. The method of claim 1 wherein said scanning is controlled by said processor asynchronously at a higher priority than said processing of said image to preclude a loss of a said scanned image due to said processor being unavailable to read said scanned image from said scanning means.

3. The method of claim 1 wherein said processing is performed asynchronously with respect to the velocity of movement of said robotic arm.

4. The method of claim 1 wherein a positional calibration of said robotic arm is performed by said scanning means and said processor while said robotic arm is moving.

5. The method of claim 1 wherein said scanning is performed only when said scanning means is located in a position to scan said object.

6. The method of claim 1 wherein said scanned images stored in said second buffer are transmitted to a spaced apart site from said storage system and wherein said diagnostic purposes include:
    (i) diagnosis of problems encountered in said scanning of said labels; and
    (ii) optimization of algorithms used for processing of said images.

7. The method of claim 1 wherein:
    said cells are arranged in a plurality of adjacent columns;
    said robotic arm moves in a first direction for said scanning in any given one of said columns and in a second direction opposite said first direction for said scanning in said columns adjacent thereto; and
    said scanning occurs while said arm moves both in said first direction as well as in said second direction.

8. The method of claim 1, wherein said processing occurs selectively with respect to each of said cells, and wherein said method further includes the additional steps of:
    (i) determining whether one of said objects is present in a given one of said cells; and
    (ii) omitting the step of processing for said given one of said cells when it is determined that no object is present in said given one of said cells.

9. The method of claim 1 wherein said first buffer is a circular buffer.

10. The method of claim 1 wherein said robotic arm is moved at a right angle with respect to the longitudinal axis of said labels.

11. The method of claim 1 wherein said robotic arm is moved in a direction along the longitudinal axis of said labels.

12. The method of claim 1 wherein said objects comprise magnetic tape cartridges.

13. The method of claim 1 wherein said labels are bar code labels.

14. The method of claim 1 wherein said scanning means include a line scan video camera.

15. The method of claim 1 wherein said storage system is an automated magnetic table cartridge library system in which said objects can relatively and controllably be repositioned by said arm.

16. In a storage system having a robotic arm for placing media cartridges in and removing media cartridges from a plurality of cells, said robotic arm having scanning means attached thereto for scanning images of identification labels affixed to said media cartridges, said storage system having a processor for processing said images to identify said media cartridges; a method of operating said system for capturing said images asynchronously with the processing of said images, said method comprising the steps of:

(a) moving said robotic arm past said cells;
(b) scanning each of said labels with said scanning means to provide a scanned image for each of said labels;
(c) storing each said scanned image in a circular buffer;
(d) processing each said scanned image stored in said circular buffer seriatim to determine the identity of each of said media cartridges, wherein said scanning is controlled asynchronously by said processor at a higher priority than said processing of said image;
(e) moving said robotic arm at a substantially constant velocity while said processing is performed;
(f) storing in a diagnostic buffer said scanned images whose identity is undeterminable in said step of processing; and
(g) transmitting said scanned images stored in said diagnostic buffer to a remote site for purposes of diagnosis of problems encountered in said scanning of said labels and optimization of algorithms used for said processing of said images.

17. The method of claim 16 wherein said scanning is performed only when said scanning means is located in a position to scan said media cartridge.

18. The method of claim 16 wherein a positional calibration of said robotic arm is performed by said scanning means and said processor while said robotic arm is continuously moving.

19. The method of claim 16 wherein:
said cells are arranged in a plurality of adjacent columns;
said robotic arm moves in a first direction for said scanning in any given one of said columns and in a second direction opposite said first direction for said scanning in said columns adjacent thereto; and
said scanning occurs while said arm moves in said first direction as well as in said second direction.

20. The method of claim 16, wherein said processing occurs selectively with respect to each of said cells, and wherein said method includes the additional steps of:

(i) determining whether one of said media cartridges is present in a given one of said cells; and
(ii) omitting the step of processing for said given one of said cells when it is determined that said given one of said cells is empty.

21. In a storage system having a robotic arm for placing media cartridges in and removing media cartridges from a plurality of cells arranged in a plurality of adjacent columns, said robotic arm having scanning means attached thereto for scanning images of identification labels affixed to said media cartridges, said storage system having a processor for processing said images to identify said media cartridges, wherein said arm moves in a first direction for said scanning any given column and in a second direction opposite said first direction for said scanning either column adjacent thereto, and wherein said scanning occurs while said arm moves in said first as well as in said second direction; a method for capturing said scanned images asynchronously with respect to the processing of said scanned images, said method comprising the steps of:

(a) moving said arm from a position near one end of said column toward the opposite end of said column;
(b) scanning each of said labels to provide a scanned image for each of said labels;
(c) storing each said scanned image in a circular buffer;
(d) processing each said scanned image stored in said circular buffer seriatim to determine the identity of each of said media cartridges, wherein said scanning is controlled by said processor asynchronously at a higher priority than said processing of said image;
(e) moving said arm at a substantially constant velocity while said processing is performed;
(f) storing in a diagnostic buffer said scanned images whose identity is undeterminable in said processing step; and
(g) transmitting said scanned images stored in said diagnostic buffer to a remote site for the diagnosis of problems encountered in said scanning of said labels and optimization of algorithms used for said processing of said images.

22. The method of claim 21 including the additional steps of:
(i) determining whether one of said media cartridges is present in a given one of said cells; and
(ii) omitting the step of processing for said given one of said cells when it is determined that said given one of said cells is empty.

23. The method of claim 21 wherein said labels are bar code labels.

24. The method of claim 21 wherein said processing is performed asynchronously with respect to the velocity of movement of said arm.

25. The method of claim 21 wherein positional calibration of said arm is performed while said robotic arm is moving.

* * * * *